(12) United States Patent
Pernyer et al.

(10) Patent No.: US 12,299,990 B2
(45) Date of Patent: May 13, 2025

(54) PROCESSING AN INPUT MEDIA FEED

(71) Applicant: ASSA ABLOY AB, Stockholm (SE)

(72) Inventors: Kenneth Pernyer, Stockholm (SE);
Gustav Ryd, Stockholm (SE);
Matthaios Stylianidis, Hägersten (SE);
Anders Sahlström, Stockholm (SE);
Tanzia Haque Tanzi, Huddinge (SE);
Nieves Crasto, Danderyd (SE)

(73) Assignee: ASSA ABLOY AB, Stockholm (SE)

( * ) Notice: Subject to any disclaimer, the term of this patent is extended or adjusted under 35 U.S.C. 154(b) by 229 days.

(21) Appl. No.: 17/784,266

(22) PCT Filed: Dec. 10, 2020

(86) PCT No.: PCT/EP2020/085626
§ 371 (c)(1),
(2) Date: Jun. 10, 2022

(87) PCT Pub. No.: WO2021/116340
PCT Pub. Date: Jun. 17, 2021

(65) Prior Publication Data
US 2023/0102619 A1    Mar. 30, 2023

(30) Foreign Application Priority Data
Dec. 12, 2019    (SE) .................................... 1951444-7

(51) Int. Cl.
*G06V 10/77*    (2022.01)
*G01S 7/41*    (2006.01)
(Continued)

(52) U.S. Cl.
CPC .............. *G06V 20/52* (2022.01); *G01S 7/417* (2013.01); *G06V 10/7715* (2022.01);
(Continued)

(58) Field of Classification Search
None
See application file for complete search history.

(56) References Cited

U.S. PATENT DOCUMENTS

| 10,853,970 B1 * | 12/2020 | Akbas ................... G06T 1/0007 |
| 2016/0267380 A1 | 9/2016 | Gemello et al. |

(Continued)

FOREIGN PATENT DOCUMENTS

| CN | 110390303 | * | 10/2019 | ............... G06K 9/00 |
| GB | 2566762 | * | 3/2019 | ............... G06K 9/00 |

(Continued)

OTHER PUBLICATIONS

"International Application Serial No. PCT EP2020 085626, Response to Written Opinion filed Oct. 11, 2021 to Written Opinion mailed Feb. 26, 2021", 10 pgs.

(Continued)

*Primary Examiner* — Beniyam Menberu
(74) *Attorney, Agent, or Firm* — Schwegman Lundberg & Woessner, P.A.

(57) ABSTRACT

According to a first aspect, it is provided a method for processing an input media feed for monitoring a person. The method is performed by a media processing device comprising a media capturing device. The method comprises the steps of: obtaining an input media feed using the media capturing device; providing the input media feed to a local artificial, AI, intelligence engine, to extract at least one feature of the input media feed; and transmitting intermediate results comprising the extracted at least one feature to train a central AI model, while refraining from transmitting the input media feed. The local AI engine forms part of the media processing device. The intermediate results comprise a label of the extracted at least one feature. The label is obtained from an end result of another local AI engine.

13 Claims, 1 Drawing Sheet

(51) Int. Cl.
*G06V 10/774* (2022.01)
*G06V 10/82* (2022.01)
*G06V 10/94* (2022.01)
*G06V 20/52* (2022.01)

(52) U.S. Cl.
CPC ............ *G06V 10/774* (2022.01); *G06V 10/82* (2022.01); *G06V 10/95* (2022.01)

(56) References Cited

U.S. PATENT DOCUMENTS

| | | | |
|---|---|---|---|
| 2017/0289504 A1* | 10/2017 | Fridental | ................ H04N 7/181 |
| 2018/0018590 A1 | 1/2018 | Szeto et al. | |
| 2018/0032840 A1* | 2/2018 | Yu | ........................ G06V 10/774 |
| 2018/0032908 A1 | 2/2018 | Nagaraju et al. | |
| 2018/0032915 A1 | 2/2018 | Nagaraju et al. | |
| 2018/0240011 A1 | 8/2018 | Tan et al. | |
| 2019/0167156 A1 | 6/2019 | Heaton et al. | |
| 2019/0236773 A1 | 8/2019 | Gros et al. | |
| 2019/0236774 A1 | 8/2019 | Gros et al. | |
| 2019/0340534 A1 | 11/2019 | McMahan et al. | |
| 2019/0372859 A1 | 12/2019 | Mermoud et al. | |
| 2019/0392254 A1 | 12/2019 | Oh et al. | |
| 2020/0051565 A1* | 2/2020 | Singh | ..................... G10L 15/02 |
| 2021/0039521 A1* | 2/2021 | Hu | ............................ G06T 7/73 |

FOREIGN PATENT DOCUMENTS

| | | |
|---|---|---|
| KR | 10-2019-0103103 | 9/2019 |
| WO | 2021116340 | 6/2021 |

OTHER PUBLICATIONS

"International Application Serial No. PCT EP2020 085626, Response to Written Opinion filed Jan. 11, 2022 to Written Opinion mailed Nov. 11, 2021", 8 pgs.
"CN Application 202080086414.4 First Office Action mailed May 15, 2024", with English translation, 17 pages.
Official Action for Sweden Patent Application No. 1951444-7, dated Jul. 8, 2020, 9 pages.
Official Action for Sweden Patent Application No. 1951444-7, dated Nov. 2, 2021, 5 pages.
International Search Report and Written Opinion for International (PCT) Patent Application No. PCT/EP2020/085626, dated Feb. 26, 2021, 13 pages.
Written Opinion for the International Preliminary Examining Authority for International (PCT) Patent Application No. PCT/EP2020/085626, dated Nov. 11, 2021, 7 pages.
International Preliminary Report on Patentability for International (PCT) Patent Application No. PCT/EP2020/085626, dated Mar. 23, 2022, 17 pages.
Official Action for Sweden Patent Application No. 1951444-7, dated Dec. 7, 2022, 4 pages.
"CN Application 202080086414.4 Second Office Action mailed Aug. 23, 2024", With English Translation, 12 pgs.
"191410EP Communication pursuant to Article 94 3 EPC mailed Oct. 24, 2024", 6 pages.
"CN App No. 202080086414.4 Decision of Rejection mailed Oct. 30, 2024", with English translation, 14 pages.

* cited by examiner

PROCESSING AN INPUT MEDIA FEED

CROSS REFERENCE TO RELATED APPLICATIONS

This application is a national stage application under 35 U.S.C. 371 and claims the benefit of PCT Application No. PCT/EP2020/085626 having an international filing date of Dec. 10, 2020, which designated the United States, which PCT application claimed the benefit of Sweden Patent Application No. 1951444-7 filed Dec. 12, 2019, the disclosure of each of which are incorporated herein by reference.

TECHNICAL FIELD

The present disclosure relates to the field of media feeds, and in particular to processing an input media feed for monitoring a person using an artificial intelligence (AI) engine.

BACKGROUND

New technology opens up new opportunities. For instance, the evolution of digital cameras and communication technologies enable monitoring of people to be provided using video surveillance at relatively low cost. This can be particularly useful for elderly people or disabled people, who in this way can enjoy greatly improved quality of life by living in their own home instead of being in a staffed care facility.

Video surveillance is certainly useful, but privacy issues arise. Hardly anyone enjoys being continuously monitored using video surveillance, even if it is mainly used for machine-based monitoring of when the person needs help.

SUMMARY

One object is to reduce the exposure of sensitive data captured in a media feed while allowing a central model to be trained on local data.

According to a first aspect, it is provided a method for processing an input media feed for monitoring a person. The method is performed by a media processing device comprising a media capturing device and a local artificial intelligence, AI, engine. The method comprises the steps of: obtaining an input media feed using the media capturing device; providing the input media feed to the local AI engine to extract at least one feature of the input media feed; and transmitting intermediate results comprising the extracted at least one feature to train a central AI model, while refraining from transmitting the input media feed. The intermediate results comprise a label of the extracted at least one feature. The label is obtained from an end result of another local AI engine. The local AI engine forms part of the media processing device.

The local AI engine and/or the central AI device may be based on a neural network.

The label may be obtained from an end result of the local AI engine. This implies that the intermediate result is stored until the local AI engine infers its end result.

The intermediate results may comprise a bounding box.

The method may further comprise the step of: transmitting the at least one feature to a central AI device while refraining from transmitting the input media feed.

The input media feed may comprise a plurality of media types.

The media capturing device may comprise a camera and the input media feed may comprise a video feed.

The media capturing device may comprise a microphone and the input media feed may comprise an audio feed.

The media capturing device may comprise a radar and the input media feed comprises a radar data feed.

According to a second aspect, it is provided a media processing device for processing an input media feed for monitoring a person. The media processing device comprises: a media capturing device; a local artificial intelligence, AI, engine; a processor; and a memory storing instructions that, when executed by the processor, cause the media processing device to: obtain an input media feed using the media capturing device; provide the input media feed to the local AI engine, to extract at least one feature of the input media feed; and transmit intermediate results comprising the extracted at least one feature to train a central AI model, while refraining from transmitting the input media feed. The intermediate results comprise a label of the extracted at least one feature. The label is obtained from an end result of another local AI engine.

The local AI engine and/or the central AI device may be based on a neural network.

The label may be obtained from an end result of the local AI engine. This implies that the intermediate result is stored until the local AI engine infers its end result.

The intermediate results may comprise a bounding box.

The media processing device may further comprise instructions that, when executed by the processor, cause the media processing device to: transmit the at least one feature to a central AI device while refraining from transmitting the input media feed.

The input media feed may comprise a plurality of media types.

The media capturing device may comprise a camera and the input media feed comprises a video feed.

The media capturing device may comprise a microphone and the input media feed comprises an audio feed.

The media capturing device may comprise a radar and the input media feed comprises a radar data feed.

According to a third aspect, it is provided a computer program for processing an input media feed for monitoring a person. The computer program comprises computer program code which, when run on a media processing device comprising a media capturing device and a local artificial intelligence, AI, engine, causes the media processing device to: obtain an input media feed using the media capturing device; provide the input media feed to the local AI engine, to extract at least one feature of the input media feed; and transmit intermediate results comprising the extracted at least one feature to train a central AI model, while refraining from transmitting the input media feed. The intermediate results comprise a label of the extracted at least one feature. The label is obtained from an end result of another local AI engine.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
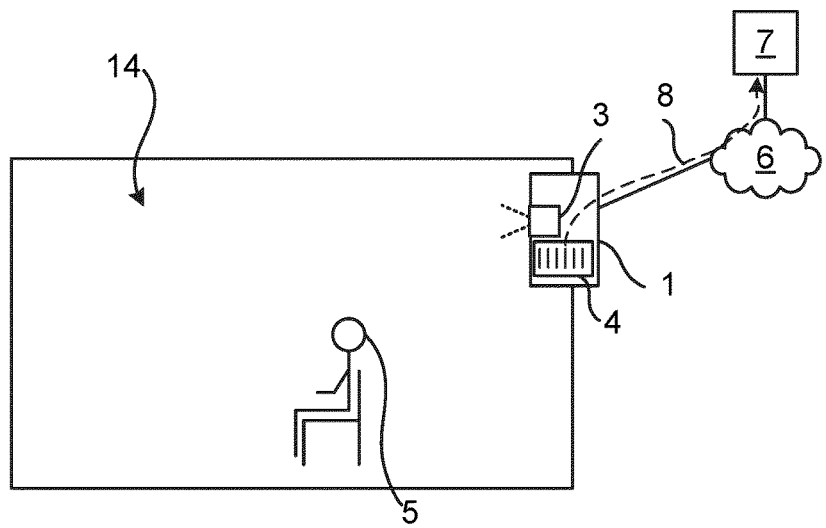
FIG. 1 is a schematic diagram illustrating an environment in which embodiments presented herein can be applied.

FIG. 1 is a schematic diagram illustrating an environment in which embodiments presented herein can be applied. A person 5 to be monitored is at least part of the time present in a physical space 14. The person 5 can also be referred to as a main actor. The physical space 14 can e.g. be a room, a flat, a house, an office etc. A media processing device 1 is configured to monitor the person based on a media capturing device 3. The media processing device 1 contains a local Artificial Intelligence (AI) engine 4, sometimes referred to as being on 'the edge'. There may be one or more media processing devices 1 working in parallel on the same or complementing scene.

The media processing device 1 is connected to a network 6, which can be an internet protocol (IP) based network. The network can e.g. comprise any one or more of a local wireless network, a cellular network, a wired local area network, a wide area network (such as the Internet), etc. Also connected to the network 6 is a central AI device 7, sometimes referred to as being in 'the cloud'. As explained in more detail below, the central AI device 7 is trained based on intermediate results 8 from local AI models in local AI engines 4 in the one or more media processing devices 1.

The trained central AI device 7 can be used in continuous deployment to improve performance of the one or more local AI engines 4. The media processing device 1 and/or the central AI device 7 infers results based on input data. Non-limiting examples of such results are: lying on the floor, breathing, screaming, a specific gesture, absent user, present user, etc. The results are used to determine whether to trigger an alarm to help the person 5. When inference of results is performed in the media processing device 1. this has the advantage of being able to react faster, i.e. with lower latency. When inference of results is performed in the central AI device 7, this has the advantage of having greater computing capacity and can be more accurate in its inference since it can be based on multiple feeds from multiple media processing devices. In one embodiment, a result is first inferred using the media processing device 1 and subsequently, the central AI device 7 is used as a second opinion. For instance, an alarm can be triggered if it determined that the person 5 has fallen to the floor and is unable to get up.

The alarm can e.g. result in assigning caretakers or medical personnel to go to the physical space 14 when the person 5 is in need of help.

There may be one or more media capturing devices 3 to cover a smaller or larger physical space. The media capturing device 3 can be based on any one or more of video, audio, radar, infrared sensor, etc.

Figure 2:
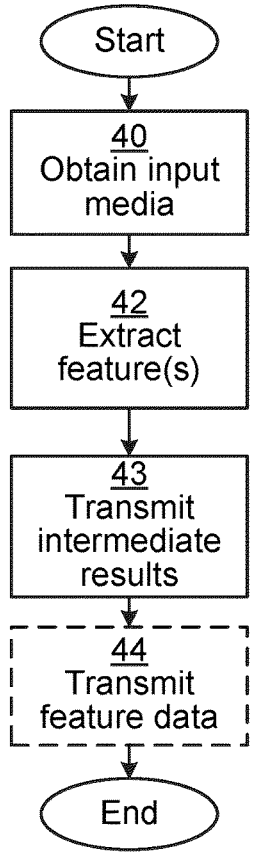
FIG. 2 is a flow chart illustrating embodiments of methods for processing an input media feed.

FIG. 2 is a flow chart illustrating embodiments of methods for processing an input media feed for monitoring a person. The method is performed by the media processing device. As described above, the media processing device comprises a media capturing device and a local AI engine. Several instances of the method can be performed in parallel by different media processing devices, or at least different machine learning models, for the same physical space.

In an obtain input media step 40, the media processing device obtains an input media feed using the media capturing device. The input media feed can be a single media type. Alternatively, the input media feed comprises a plurality of media types. A purpose of the media feed is to monitor the person and to enable the determination of when the person is in need of help.

The media capturing device can comprise a camera in which case the input media feed comprises a video feed. Alternatively or additionally, the media capturing device can comprise a microphone in which case the input media feed comprises an audio feed. Alternatively or additionally, the media capturing device can comprise a radar in which case the input media feed comprises a radar data feed. The use of several different media feeds improves the ability to determine the state of the person. Additionally, one media feed can be fed to different AI models for different purposes, e.g. a video feed can be fed both to an AI model for determining posture (standing, sitting, lying down) and an AI model for determining whether the person is under distress.

In an extract feature(s) step 42, the media processing device provides the input media feed through the local AI engine (also known as a machine learning model), to extract at least one feature of the input media feed. The local AI engine can be based on a neural network.

The term 'feature' is here applied in the context of machine learning. Hence the term 'feature' is here defined as an individual measurable property or characteristic of a phenomenon being observed. For instance, when applied for visual data, features can be edges or other shapes that early layers of an AI model are good at highlighting.

When the scene is static, the neural network can mask out such static information (regardless or media type) which do not contribute to the inference. Certain situations change during the day and over the seasons, e.g. light, decorations, people coming and going. Sometimes the changes are important for training the machine learning models, but sometimes the changes are simply recurring patterns (e.g. light depending on time of day), whereby the feature extraction can be tailored based on this. In this way, mainly information needed for training and domain specific inference will be passed to later feature extraction layers and to training.

In a transmit intermediate results step 43, the media processing device transmits intermediate results comprising the extracted at least one feature (from step 42) to train a central AI model, while refraining from transmitting the input media feed. The central AI model can e.g. be based on one or more neural networks. The intermediate result contains the at least one feature (being from an intermediate level in the local AI engine). The intermediate result can further comprise a label of the extracted at least one feature. A label is used in ML training to indicate a correct result for a certain set of input data. The label is obtained from an end result of another AI model evaluating the same scene, either using the same sensor data or other sensor data. The intermediate result can also comprise a bounding box, defining a rectangular sub-area within an image which contains relevant data. For instance, the intermediate result can comprise a bounding box containing the person, but the bounding box is defined to be the smallest rectangle containing the person, thus disregarding most irrelevant data around the person. The bounding box can be extracted in a relatively early layer when processing image or video data. When this step is performed by several media processing devices for the same decision device, the central AI model will improve greatly. The intermediate results are obtained from the local AI model prior to inference of result, i.e. from an intermediate layer prior to the final layer. After masking and pooling from several sources in a central model, the intermediate results are irreversible.

In an optional transmit feature data step 44, the media processing device transmits the at least one feature to a decision device, while refraining from transmitting the input media feed. In other words, the input media feed never leaves the media processing device. In one embodiment, the feature data is transmitted as part of the intermediate results transmitted in step 43. The features that are transmitted can be used in a central (machine learning) model, which is based on several such feature feeds for inference.

The central AI model will generalise better when it is trained on as much local intermediate data as possible. Hence, multi-sourcing of local data feeds will help the central model in feature extraction and labelling, allowing such processes to occur with less manual intervention, while still improving privacy compared to the prior art. Applicable parts of the trained central model can be deployed in the local AI engine as part of a continuous deployment process. Optionally, the local AI engine evaluates any received new model and only replaces the old local AI model if the new model performs better in the evaluation.

Using embodiments presented herein, the media processing device processes the media feed locally using the local AI engine. Since the media data processor comprises the media capturing device, this processing of the media feed is performed without the media feed needing to leave the media processing device. According to embodiments herein, instead of providing the privacy sensitive media stream to the central AI engine for training, the media processing device here provides the intermediate feature(s) (i.e. the intermediate results) to the central AI engine. The intermediate features are configured to not be privacy sensitive, whereby the person can comfortably allow the media processing device and its media capturing device to be active continuously. Furthermore, by transmitting intermediate feature(s) instead of the media feed, less data needs to be transferred, effectively reducing bandwidth usage on the communication between the media processing engine and the central AI engine. Hence, the central AI model can be trained based on anonymised local sensor data, and the trained central AI model can be used for continuous deployment of the local AI model, i.e. continuous improvement of the local AI model.

Moreover, using the labelling from another local AI engine, the labelling is performed by the complete results of the other local AI engine. The labelling of the other local AI engine does not depend on the local AI engine for which intermediate results are transmitted. The labelling is performed by running the other local AI engine, which results in automatic labelling. This enables the process for training of the central AI model to be performed without manual labelling, greatly reducing effort and improving reliability of training. In other words, this achieves unsupervised training. Moreover, this allows repetitive automatic training of the central AI model.

Figure 3:
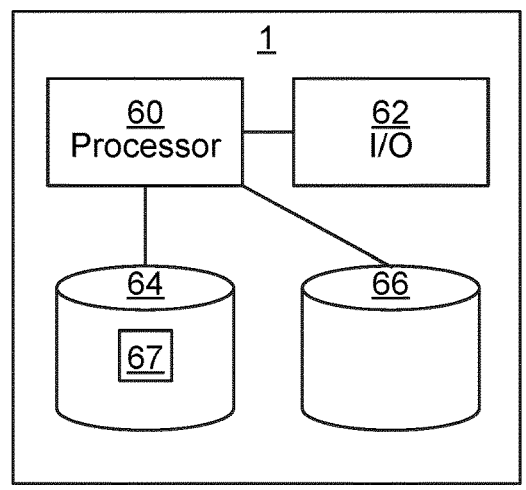
FIG. 3 is a schematic diagram illustrating components of the media processing device of FIG. 1.

FIG. 3 is a schematic diagram illustrating components of the media processing device 1 of FIG. 1. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 2 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The media processing device 1 further comprises an I/O interface 62 for communicating with external and/or internal entities. For instance, the I/O interface 62 allows the media processing device 1 to communicate the network 6. Optionally, the I/O interface 62 also includes a user interface.

Other components of the media processing device 1 are omitted in order not to obscure the concepts presented herein.

Figure 4:
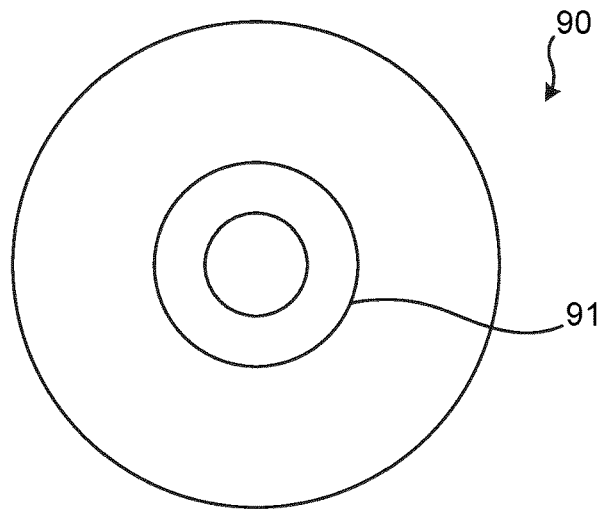
FIG. 4 shows one example of a computer program product comprising computer readable means.

FIG. 4 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 3. While the computer program 91 is here schematically shown as a track on the depicted optical disk, the computer program can be stored in any way which is suitable for the computer program product, such as a removable solid-state memory, e.g. a Universal Serial Bus (USB) drive.

Here now follows a set of embodiments enumerated with roman numerals.

i. A method for processing an input media feed, the method being performed by a media processing device comprising a media capturing device and a local artificial, AI, engine, the method comprising the steps of:
  obtaining an input media feed using the media capturing device;
  providing the input media feed to the local AI engine to extract at least one feature of the input media feed; and transmitting intermediate results comprising the extracted at least one feature to train a central AI model, while refraining from transmitting the input media feed.

ii. The method according to embodiment i, wherein the local AI engine is based on a neural network.

iii. The method according to any one of the preceding embodiments, wherein the intermediate results comprise a label of the extracted at least one feature.

iv. The method according to any one of the preceding embodiments, wherein the label is obtained from an end result of the local AI engine.

v. The method according to any one of the preceding embodiments, wherein the label is obtained from an end result of another local AI engine.

vi. The method according to any one of the preceding embodiments, wherein the intermediate results comprise a bounding box.

vii. The method according to any one of the preceding embodiments, further comprising the step of:
transmitting the at least one feature to a central AI device while refraining from transmitting the input media feed.

viii. The method according to any one of the preceding embodiments, wherein the input media feed comprises a plurality of media types.

ix. The method according to any one of the preceding embodiments, wherein the media capturing device comprises a camera and the input media feed comprises a video feed.

x. The method according to any one of the preceding embodiments, wherein the media capturing device comprises a microphone and the input media feed comprises an audio feed.

xi. The method according to any one of the preceding embodiments, wherein the media capturing device comprises a radar and the input media feed comprises a radar data feed.

xii. A media processing device for processing an input media feed, the media processing device comprising:
a media capturing device;
a local artificial intelligence, AI, engine;
a processor; and
a memory storing instructions that, when executed by the processor, cause the media processing device to:
obtain an input media feed using the media capturing device;
provide the input media feed to the local AI engine, to extract at least one feature of the input media feed; and
transmit intermediate results comprising the extracted at least one feature to train a central AI model, while refraining from transmitting the input media feed.

xiii. The media processing device according to embodiment xii, wherein the local AI engine is based on a neural network.

xiv. The media processing device according to embodiment xii or xiii, wherein the intermediate results comprise a label of the extracted at least one feature.

xv. The media processing device according to any one of embodiments xii to xiv, wherein the label is obtained from an end result of the local AI engine.

xvi. The media processing device according to any one of embodiments xii to xv, wherein the label is obtained from an end result of another local AI engine.

xvii. The media processing device according to any one of embodiments xii to xvi, wherein the intermediate results comprise a bounding box.

xviii. The media processing device according to any one of embodiments xii to xvii, further comprising instructions that, when executed by the processor, cause the media processing device to:
transmit the at least one feature to a central AI device while refraining from transmitting the input media feed.

xix. The media processing device according to any one of embodiments xii to xviii, wherein the input media feed comprises a plurality of media types.

xx. The media processing device according to any one of embodiments xii to xix, wherein the media capturing device comprises a camera and the input media feed comprises a video feed.

xxi. The media processing device according to any one of embodiments xii to xx, wherein the media capturing device comprises a microphone and the input media feed comprises an audio feed.

xxii. The media processing device according to any one of embodiments xii to xxi, wherein the media capturing device comprises a radar and the input media feed comprises a radar data feed.

xxiii. A computer program for processing an input media feed, the computer program comprising computer program code which, when run on a media processing device, comprising a media capturing device and a local artificial intelligence, AI, engine, causes the media processing device to:
obtain an input media feed using the media capturing device;
provide the input media feed to the local AI engine, to extract at least one feature of the input media feed; and
transmit intermediate results comprising the extracted at least one feature to train a central AI model, while refraining from transmitting the input media feed.

xxiv. A computer program product comprising a computer program according to embodiment xxiii and a computer readable means on which the computer program is stored.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for processing an input media feed for monitoring a person, the method being performed by a media processing device comprising a media capturing device and a local artificial intelligence, AI, engine based on a neural network, the method comprising:
obtaining an input media feed using the media capturing device;
providing the input media feed to the local AI engine to extract at least one feature of the input media feed; and
transmitting intermediate results comprising the extracted at least one feature to train a central AI model, while refraining from transmitting the input media feed, wherein the intermediate results comprise a label of the extracted at least one feature, wherein the label is obtained from an end result of another local AI engine evaluating a same scene that is featured in the input media feed.

2. The method according to claim 1, wherein the intermediate results comprise a bounding box containing the person.

3. The method according to claim 1, wherein the input media feed comprises a plurality of media types.

4. The method according to claim 1, wherein the media capturing device comprises a camera and the input media feed comprises a video feed.

5. The method according to claim 1, wherein the media capturing device comprises a microphone and the input media feed comprises an audio feed.

6. The method according to claim 1, wherein the media capturing device comprises a radar and the input media feed comprises a radar data feed.

7. A media processing device for processing an input media feed for monitoring a person, the media processing device comprising:
- a media capturing device;
- a local artificial intelligence, AI, engine based on a neural network;
- another local AI engine;
- a processor; and
- a memory storing instructions that, when executed by the processor, cause the media processing device to:
  - obtain an input media feed using the media capturing device;
  - provide the input media feed to the local AI engine, to extract at least one feature of the input media feed; and
  - transmit intermediate results comprising the extracted at least one feature to train a central AI model, while refraining from transmitting the input media feed, wherein the intermediate results comprise a label of the extracted at least one feature, wherein the label is obtained from an end result of the another local AI engine evaluating a same scene that is featured in the input media feed.

8. The media processing device according to claim 7, wherein the intermediate results comprise a bounding box containing the person.

9. The media processing device according to claim 7, wherein the input media feed comprises a plurality of media types.

10. The media processing device according to claim 7, wherein the media capturing device comprises a camera and the input media feed comprises a video feed.

11. The media processing device according to claim 7, wherein the media capturing device comprises a microphone and the input media feed comprises an audio feed.

12. The media processing device according to claim 7, wherein the media capturing device comprises a radar and the input media feed comprises a radar data feed.

13. A non-transitory computer readable medium storing a computer program for processing an input media feed for monitoring a person, the computer program comprising computer program code which, when run on a media processing device, comprising a media capturing device and a local artificial intelligence, AI, engine, causes the media processing device to:
- obtain an input media feed using the media capturing device;
- provide the input media feed to the local AI engine based on a neural network, to extract at least one feature of the input media feed; and
- transmit intermediate results comprising the extracted at least one feature to train a central AI model, while refraining from transmitting the input media feed, wherein the intermediate results comprise a label of the extracted at least one feature, wherein the label is obtained from an end result of another local AI engine evaluating a same scene that is featured in the input media feed.

* * * * *